A. E. COOK.
CIRCULAR DISK REAPER.
APPLICATION FILED DEC. 12, 1917.
1,397,365.
Patented Nov. 15, 1921.
3 SHEETS—SHEET 1.
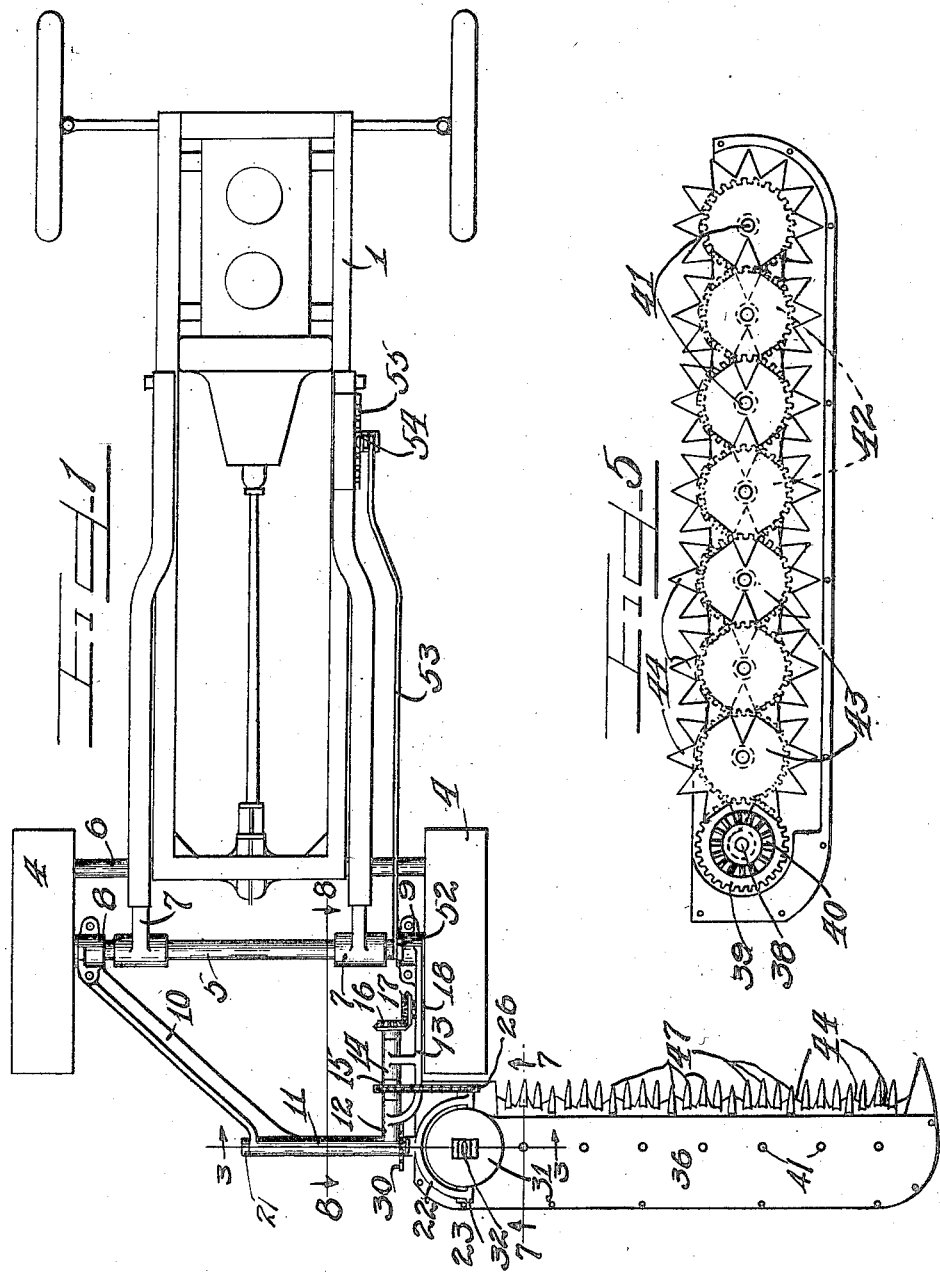
Witnesses
J. W. Argill
Charles W. Illag.
Inventor
Albert E. Cook
By Charles W. Vill Atty A. E. COOK.
CIRCULAR DISK REAPER.
APPLICATION FILED DEC. 12, 1917.
1,397,365.
Patented Nov. 15, 1921.
3 SHEETS—SHEET 2.
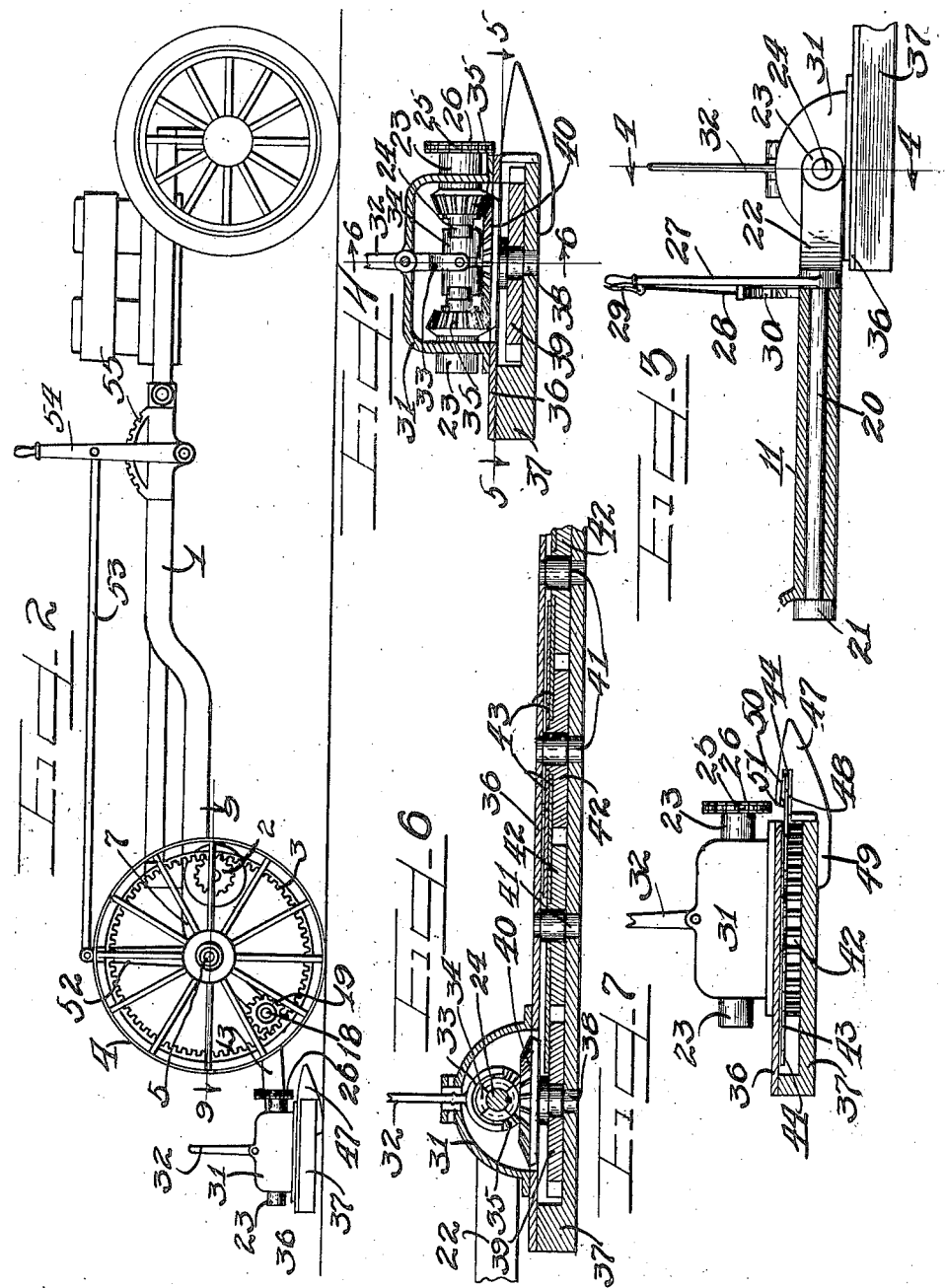

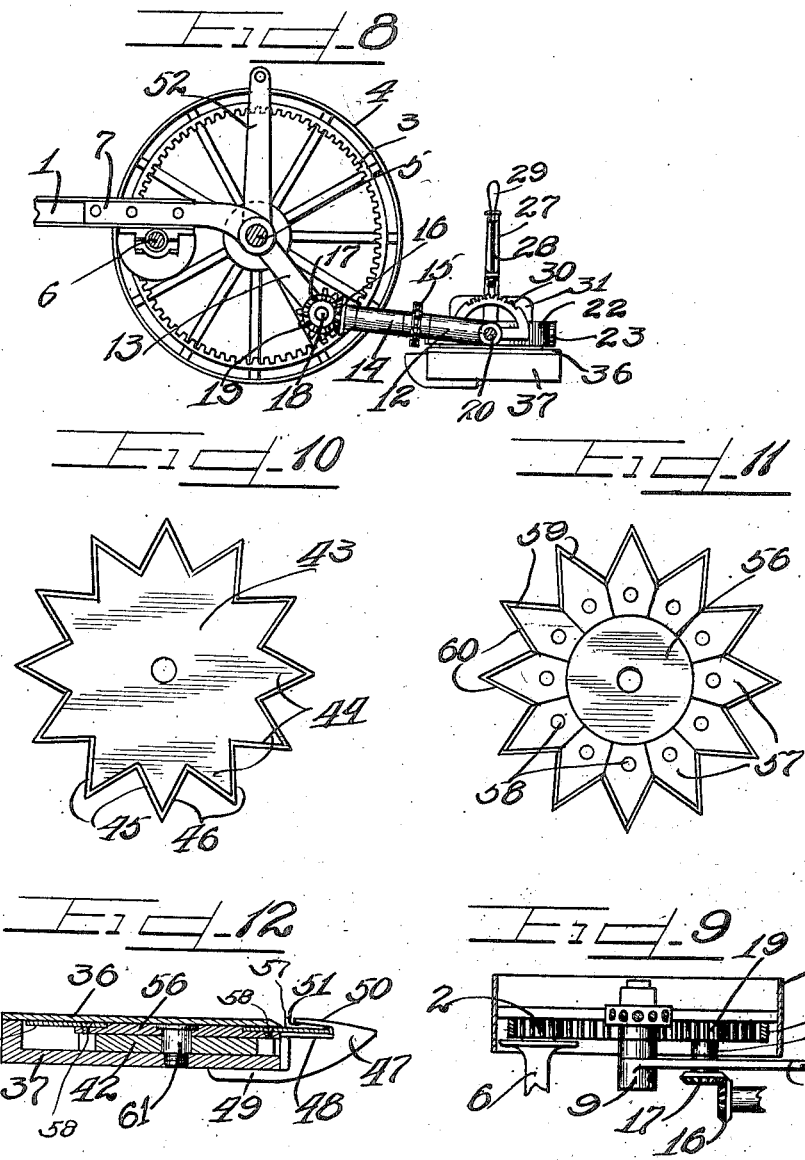

UNITED STATES PATENT OFFICE.

ALBERT E. COOK, OF EVANSTON, ILLINOIS.

CIRCULAR-DISK REAPER.

1,397,365. Specification of Letters Patent. Patented Nov. 15, 1921.

Application filed December 12, 1917. Serial No. 206,733.

*To all whom it may concern:*

Be it known that I, ALBERT E. COOK, a citizen of the United States, and a resident of the city of Evanston, in the county of Cook and State of Illinois, have invented certain new and useful Improvements in a Circular-Disk Reaper; and I do hereby declare that the following is a full, clear, and exact description of the same, reference being had to the accompanying drawings, and to the numerals of reference marked thereon, which form a part of this specification.

This invention relates to an improved form of reaper, mower or grain harvesting machine adapted to be removably attached to a motor driven vehicle, and equipped with a cutter mechanism adapted to cut grass, grain or cane by means of a plurality of gear actuated overlapping cutter disks adapted to be horizontally and reversely rotated in opposite directions with respect to one another to co-act with stationary guard means associated with said cutter disks.

It is an object of this invention to construct a reaper cutting mechanism comprising overlapping circular disks having gears secured thereto adapted to intermesh with one another to cause rotation of adjacent disks in opposite directions.

Another object of this invention is the construction of a cutting mechanism in which reversely rotating overlapping disks are simultaneously rotated by means of inter-meshing gears forming a part of said disks, to permit said disks to coact with stationary guards whereby larger quantities of material may be cut in a given time than has heretofore been possible.

It is a further object of this invention to provide rotating cutter mechanism for reapers which may have the direction of rotation thereof reversed to permit use of both cutting edges of the cutter blades forming a part of said disks.

An important object of the invention is the construction of an adjustable reaper cutting mechanism wherein stationary guards have associated therewith a plurality of horizontally rotating disks arranged to permit the direction of rotation of all of said disks to be reversed simultaneously.

It is furthermore an object of the invention to provide a high speed reaper cutting mechanism wherein intermeshing gears are provided to cause removable adjacently disposed overlapping disks to be rotated in opposite directions to co-act with a removable stationary guard.

A further important object of the invention is the construction of a pivotally and adjustably mounted reaper cutter mechanism wherein circular cutting disks are removably mounted and connected with the driving wheels of the reaper through a reversing mechanism whereby said disks may have the direction of rotation thereof changed as desired.

It is an important object of the invention to provide a reaper cutter mechanism of simple and effective construction whereby gear connected disks may be alternately rotated in opposite directions by shifting means disposed between said disks and a driving wheel of the reaper.

Other and further important objects of this invention will be apparent from the disclosures in the specification and drawings.

The invention (in a preferred form) is illustrated in the drawings and hereinafter more fully described.

On the drawings:

Figure 1 is a top plan view of a reaper removably attached to a motor vehicle and having a circular disk cutting mechanism attached thereto embodying the principles of this invention.

Fig. 2 is a side elevational view thereof.

Fig. 3 is a section taken on line 3—3 of Fig. 1, with parts shown in elevation.

Fig. 4 is a section taken on line 4—4 of Fig. 3, with parts shown in elevation.

Fig. 5 is a detail plan view of the cutter mechanism taken on line 5—5 of Fig. 4.

Fig. 6 is a section on line 6—6 of Fig. 4, with parts broken away and with parts shown in elevation.

Fig. 7 is an enlarged section taken on line 7—7, of Fig. 1, with parts in elevation.

Fig. 8 is a sectional view taken on line 8—8 of Fig. 1.

Fig. 9 is a section taken on line 9—9 of Fig. 2, with parts broken away and parts in elevation.

Fig. 10 is a detail plan view of one of the cutter disks.

Fig. 11 is a modified form of cutter disk provided with removable blades.

Fig. 12 is a transverse section of a cutter mechanism using the modified form of cutter disk.

As shown on the drawings:

The reference numeral 1, indicates the chassis of an automobile or other similar type of motor vehicle, the rear wheels of which are replaced by driving gears 2, which mesh with inner peripheral gears 3, forming a part of reaper or tractor driving wheels 4, rotatably journaled on the ends of a reaper or tractor axle 5, mounted to the rear of the driving axle 6, of the automobile in extension brackets 7, rigidly secured to the chassis. Removably and pivotally secured to the rear of the axle 5, by means of clamps 8 and 9, is a rearwardly extending supporting frame, comprising a rearwardly and downwardly directed brace bar 10, having one end thereof integral with the clamping member 8, and the other end thereof integrally connected to one end of a bearing tube or pipe 11, disposed parallel to the axle 5.

Formed at right angles to the other end of the tube 11, is a passaged bearing arm or sleeve 12, which projects inwardly toward the reaper and has integrally secured thereto one end of an inwardly and upwardly directed brace bar 13, the other end of which is integrally connected to the clamping member 9. A sleeve 14, integrally supported on the brace bar 13, is spaced a short distance from the passaged bearing sleeve 12, and is axially alined therewith. Rotatably journaled in said sleeves 12 and 14 is a short shaft having a sprocket wheel 15, rigidly secured thereon between said sleeves. Also rigidly secured on the extending end of said short shaft is a bevel pinion 16, which meshes with another bevel pinion 17, secured on one end of a stub shaft 18, supported by the brace bar 13, and having a driving gear 19, secured on the other end thereof, which is in mesh with the inner gear 3, which forms part of one of the driving wheels 4.

Rotatably disposed in the tube 11, is a pivot shaft 20, provided at one end with a head 21, and at its other end with a yoke 22, the ends of which are provided with suitable bearings 23, for pivotally supporting shaft 24, therein. The shaft 24, has secured thereon to the outside of one of the yoke bearings 23, a sprocket wheel 25, disposed in the plane of the sprocket wheel 15, to permit a sprocket chain 26, to be engaged around said sprocket wheels 15 and 25, for transmitting a drive from the driving wheels 4, to the shaft 24. Integrally formed on the shaft 20, is an upwardly directed lever 27, provided with a manually operatable catch 28, controlled by means of a handle 29. Said catch normally engages in a gear segment 30, formed on the tube 11, to the outside of the sleeve 12.

Mounted on the shaft 24, between the arms of the yoke 22, is a casing or housing 31, having pivotally supported thereon an upwardly directed shifting or reversing lever 32, the inner end of which is yoked as denoted by the reference numeral 33. Mounted within the casing 31, is a clutch reversing mechanism comprising a clutch 34, slidably keyed on the shaft 24, for rotation therewith. Said clutch is provided with a peripheral groove to permit the inner ends of shifting pins secured to the yoke 33, to engage therein to afford a means of slidably shifting the clutch 34, on said shaft 24, when the lever 32, is moved out of normal vertical position to permit the clutch 34, to removably engage within either one of a pair of beveled gears or pinions 35, rotatably mounted on said shaft on opposite sides of the clutch, as clearly shown in Fig. 4.

The cutting mechanism for the reaper comprises a top plate 36, one end of which is rigidly secured to the bottom of the casing 31, and is provided with an opening or aperture which is positioned directly below said casing to register with the interior thereof. Said plate 36, normally extends to one side of the chassis 1, and at right angles thereto, as clearly shown in Fig. 1. Removably secured below said plate 36, is a tray or holder 37, open at the top and along the front side thereof. Rotatably mounted in the bottom of the tray 37, below the casing 31, is the lower end of a stub shaft 38, on which is keyed or otherwise rigidly secured a main or master gear 39, disposed adjacent to the inner surface of the bottom of said tray. Secured or formed on the upper end of the stub shaft 38, is a large bevel gear 40, which is positioned in the opening in said plate 36, and projects into the casing 31, and meshes with both of the loose bevel pinions 35, to receive a drive therefrom when either one thereof is engaged by the clutch 34, thereby causing rotation of the master gear 39. Disposed in the same plane longitudinally of the tray 37, are a plurality of spaced parallel stub shafts 41, having the ends thereof rotatably journaled in the bottom of said tray, and in the plate 36. Keyed or otherwise secured to each of said stub shafts 41, adjacent the inner surface of the bottom of the tray 37, and in the plane of the master gear 39, is a secondary gear 42, of a size sufficient to permit the same to intermesh with one another, and with the gear 42, nearest the master gear 39, meshing therewith to receive a drive therefrom. Removably secured by any suitable means upon the upper surface of each of the gears 42, is a circular cutter disk 43, each provided with a plurality of radially disposed blades 44, provided with oppositely directed cutting edges 45 and 46, as shown in Fig. 10. The diameter of said cutting disks is greater than that of the gears 42, to permit adjacently disposed disks to overlap one another, as shown in Figs. 5 and 6, and further permitting said disks to extend outwardly beyond the front edges of the tray 37, and the cover plate 36, into a cutting position. Removably secured by screws or other suitable means to the bottom and across the front of the tray 37, are a plurality of adjacently disposed stationary guard teeth 47, provided with cutting edges 48, which are positioned beneath the blades 44, of the rotating cutter disks to co-act therewith to cut grass or grain coming in contact with said cutters. As shown in detail in Fig. 7, the stationary guard teeth 47, are each provided with a mounting flange 49, adapted to engage against the under surface of the bottom of the tray, and with rearwardly directed tongues or shields 50, providing a notch or recess 51, through which the blades of the rotating disks 43, pass during a cutting operation.

Integrally formed or rigidly secured to the clamping member 9, is an upwardly projecting arm 52, having pivotally connected to the upper end thereof, one end of a connecting rod 53, the other end of which is pivotally connected to an adjusting or control lever 54, pivotally mounted on the chassis 1, near the front end thereof, to be operated by the driver of the reaper, when it is desired to elevate or lower the cutting mechanism. A gear segment 55, is associated with the lever 54, to hold the same locked in an adjusted position.

Figs. 11 and 12, disclose a modified form of cutting disk embracing a circular mounting or base plate 56, provided with a peripheral notch to permit a plurality of individual cutter blades 57, to seat in said notch and be removably secured to said base plate 56, independently of one another by means of screws 58, or other means. Said individual cutter blades 57, are radially disposed in the same plane on said base plate adjacent each other and are each provided with oppositely directed cutting edges 59 and 60, which extend beyond the outer edge of the base plate. As shown in Fig. 12, the modified form of cutter disk is shown removably associated with one of the gears 42, and rotatably mounted with said gear within the tray 37, by means of a stationary screw shaft 61.

The operation is as follows:

With the improved form of cutting mechanism in position as described and as shown in Figs. 1 and 2, by moving the adjusting lever 54, either rearwardly or forwardly, the supporting frame bars 10 and 13, are lowered or raised thereby simultaneously lowering or raising the cutting mechanism supported thereby into any desired position with respect to the distance from the ground. The cutting mechanism and the supporting frame therefor are thus held in a predetermined adjusted position by suitable locking means in the lever 54, removably engaging the gear segment 55.

By actuating the handle 29, to release the latch 28, from engagement with the gear segment 30, the lever 27, can be moved toward or away from the chassis 1, thus affording a means for pivoting the cutting mechanism on the pivot shaft 20, downwardly toward or upward away from the ground. The pivoted arrangement of the cutting mechanism on the shaft 24, permits the mechanism to be swung upwardly into a position out of use.

Due to the arrangement of the driving gears and pinions, a drive is transmitted from the inner gear 3, of one of the driving wheels 4, through the chain 26, to the shaft 24, rotatably journaled in the casing 31. The shifting lever 32, in normal position, is disposed vertically, as shown in Fig. 4, in which position the clutch is out of engagement with the idler bevel pinions 35, in which position the rotatably mounted cutter disks are stationary. If the lever 32, is now shifted forwardly, the clutch 34, is slidably moved on the rotating shaft 24, to engage the bevel pinion 35, nearest the rear of the cutting mechanism, thereby rotating said pinion 35, with the shaft 24, thus causing the large bevel gear 40, in mesh therewith, to be rotated. The master gear 39, associated with the large bevel gear 40, is rotated simultaneously therewith. The inter-meshing disk gears 42, are also set in operation with the rotation of said large bevel gear 40, thereby rotating the cutter disks 43, secured thereto, which co-act with the cutting edges 48, of the stationary guards 47, if used to cut grain, corn or cane at a rate of speed depending upon the speed of the reaper machine. The inter-meshing arrangement of the gears 42, causes the odd numbered gears 42, starting from the left (looking at Fig. 5), to rotate in a direction opposite to that of the master gear 39, while the even numbered gears 42, are rotated in the same direction as is the master gear. This arrangement, of course, also causes the respective overlapping cutter disks 43, to rotate in opposite directions with respect to one another.

The shift lever 32, may now be thrown rearwardly, thus throwing the clutch 34, into driving engagement with the other bevel pinion 35, thus reversing the direction of rotation of the large bevel gear 40, the master gear 39, and the gears 42, whereby the rotation of the rotating cutter disks 43, is also reversed, thus affording a ready means for using either of the cutting edges 45 or 46, of said cutting disks.

The cutting mechanism is so constructed that the cutting disks 43, may be readily replaced or removed from the tray 37, for repairs or sharpening, if necessary. The cutting mechanism and its supporting frame may be removed and connected with any other suitable traction or propelling means.

It will also be understood that the cutting mechanism may be provided with a separate driving motor, and that said cutting mechanism may be located in a position to the front of the driving wheels of the motor driven vehicle in place of in the rear thereof.

I am aware that various details of construction may be varied through a wide range and numerous changes may be made without departing from the principles of my invention, and I therefore do not purpose limiting the patent granted otherwise than necessitated by the prior art.

I claim as my invention:

1. In a device of the class described, the combination with a vehicle, of a cutting unit adjustably attached to the vehicle, drive wheels forming part of the cutting unit and supporting the rear end of the vehicle, a plurality of cutting disks, gears associated therewith, and means connecting said drive wheels with said gears for rotatably driving said cutting disks in either direction.

2. The combination with a motor driven vehicle, of a cutting unit removably attached thereto, drive wheels forming a part of said unit supporting the rear end of the vehicle and connected to be driven from the vehicle motor, a cutter holder adjustably mounted on said unit, a plurality of overlapping cutters mounted on said holder, and means connected to receive a drive from one of said drive wheels and adapted to rotate the cutters and reverse the direction of rotation thereof.

3. The combination with a motor driven vehicle, of a cutting unit removably attached thereto, drive wheels on said cutting unit supporting the rear end of said vehicle and connected to be driven from the vehicle rear axle, a cutter holder adjustably mounted on said unit, overlapping cutting disks rotatably mounted on said holder, gears associated therewith, means connected with said gears and with one of said drive wheels for rotatably driving said cutting disks, and a mechanism for reversing the direction of rotation of said cutting disks.

In testimony whereof I have hereunto subscribed my name in the presence of two subscribing witnesses.

ALBERT E. COOK.

Witnesses:
 EARL M. HARDINE,
 CHARLES W. HILLS, Jr.